United States Patent [19]

Barsotti

[11] Patent Number: 4,614,683
[45] Date of Patent: Sep. 30, 1986

[54] CHIP RESISTANT PRIMER COMPOSITION

[75] Inventor: Robert J. Barsotti, Franklinville, N.J.

[73] Assignee: E. I. Du Pont de Nemours and Company, Wilmington, Del.

[21] Appl. No.: 728,881

[22] Filed: Apr. 30, 1985

[51] Int. Cl.$^4$ .......................... B32B 7/00; C08K 3/36; C08K 3/04
[52] U.S. Cl. .................. 428/220; 428/423.1; 524/44; 524/425; 524/507; 524/539
[58] Field of Search ............... 524/425, 539, 507, 44, 524/493; 525/440, 520; 428/220, 423.1

[56] References Cited

U.S. PATENT DOCUMENTS

| | | | |
|---|---|---|---|
| 3,954,900 | 5/1976 | Schmalz et al. | 525/440 |
| 3,962,522 | 6/1976 | Chang et al. | 525/520 |
| 4,021,505 | 5/1977 | Wang | 428/423.1 |
| 4,205,115 | 5/1980 | Piccirilli et al. | 428/423.1 |
| 4,425,466 | 1/1984 | Santer et al. | 525/440 |
| 4,451,622 | 5/1984 | DiDomenico | 525/440 |
| 4,455,331 | 6/1984 | Barsotti | 524/493 |

Primary Examiner—Lewis T. Jacobs
Attorney, Agent, or Firm—Hilmar L. Fricke

[57] ABSTRACT

A coating composition used as a primer for automobiles and trucks and has excellent chip and corrosion resistance and adhesion to primed metal substrates; the composition contains a liquid carrier, a binder of a polyester urethane and a crosslinking agent of a blend of a monomeric butylated and methylated melamine formaldehyde resin and a polymeric butylated melamine formaldehyde resin.

9 Claims, No Drawings

CHIP RESISTANT PRIMER COMPOSITION

BACKGROUND OF THE INVENTION

This invention is related to coating compositions useful as a primer for automobile and truck bodies.

Particular problem areas on automobile and truck bodies are the wheel wells and the lower portions of the body such as, rocker panels. These areas are subjected to abrasion and chipping action of road dirt and debris such as sand and gravel which is thrown against these areas with considerable impact. Primer coatings used in these areas must have excellent adhesion to the substrate and have excellent chip and corrosion resistance. Also, the primer coating used in the wheel well area is not topcoated and must have resistance to weathering since the coating is exposed to the elements. The primer coated used on the rocker panels and other lower portions of the body must also provide a surface to which the pigmented or colored topcoat will adhere. Furthermore, the primer coating composition must meet with air pollution regulations and have a relatively high solids content.

The novel composition of this invention meets all of the above requirements and is an excellent primer coating for automobile and truck bodies.

SUMMARY OF THE INVENTION

A coating composition useful as a chip resistant primer primarily for automobiles and truck bodies containing about 17–80% by weight of film forming binder, about 20–83% by weight of liquid carrier and in addition to the above contains pigments in a pigment to binder weight ratio of about 50:100 to 300:100; wherein the binder contains about 50–95% by weight of a polyester urethane resin and
5–50% by weight of a crosslinking agent of a blend of a monomeric butylated and methylated melamine formaldehyde resin and a polymeric butylated melamine formaldehyde resin.

DETAILED DESCRIPTION OF THE INVENTION

The coating composition has a film forming binder content of about 17–80% by weight. Preferably, to meet current pollution regulations, the binder content is at least 28% by weight. The liquid carrier generally is an organic solvent for the binder. However, other liquid carriers can be used such as non-solvents for the binder by employing dispersants, dispersing resins and other additives.

The binder of the composition is a blend of about 50–95% by weight of a polyester urethane resin and 5–50% by weight of an alkylated melamine formaldehyde crosslinking agent.

The polyester urethane is the reaction product of a hydroxyl terminated polyester and a polyisocyanate, preferably, an aliphatic diisocyanate. The urethane has a hydroxyl number of about 75–200 and preferably 100–150 and has a weight average molecular weight of about 3,000 to 25,000 and a number average molecular weight of about 2,000 to 6,000 measured using gel permeation chromatography using polymethyl methacrylate as a standard.

Typical polyisocyanates that can be used to form the polyester urethane are as follows: isophorone diisocyanate which is 3-isocyanatemethyl-3,5,5-trimethyl-cyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethxylene diisocyanate, 2,4,4-trimethylhexamethylene diisocyanate, nonamethylene diisocyanate, 2,2,4-trimethylhexamethylene diisocyanate, decamethylene diisocyanate, 2,11-diisocyano-dodecane and the like, meta-phenylene diisocyanate, para-phenylene diisocyanate, toluene-2,4-diisocyanate, toluene-2,6-diisocyanate, xylene-2,4-diisocyanate, xylene-2,6-diisocyanate, dialkyl benzene diisocyanates, such as methylpropylbenzene diisocyanate, methylethylbenzene diisocyanate, and the like; 2,2'-biphenylene diisocyanate, 3,3'-biphenylene diisocyanate, 4,4'-biphenylene diisocyanate, 3,3'-dimethyl-4,4'-biphenylene diisocyanate, and the like; methylene-bis(4-phenyl isocyanate), ethylene-bis(4-phenyl isocyanate), isopropylidene-bis-(4-phenyl isocyanate), butylene-bis(4-phenylisocyanate, hexafluoroisopropylidene-bis(4-phenyl isocyanate), and the like; 2,2'-oxydiphenyl diisocyanate, 3,3'-oxydiphenyl diisocyanate, 4,4'-oxydiphenyl diisocyanate, 2,2'-ketodiphenyl diisocyanate, 3,3'-ketodiphenyl diisocyanate, 4,4'-ketodiphenyl diisocyanate, 2,2'-thiodiphenyl diisocyanate 3,3'-thiodiphenyl diisocyanate, 4,4'-thiodiphenyl diisocyanate, and the like; 2,2'-sulfonediphenyl diisocyanate, 3,3'-sulfonediphenyl diisocyanate, 4,4'-sulfonediphenyl diisocyanate, and the like, 2,2,-methylene-bis-(cyclohexyl isocyanate), 3,3'-methylene-bis-(cyclohexyl isocyanate), 4,4'-methylene-bis-(cyclohexyl isocyanate), 4,4'-ethylene-bis-(cyclohexyl isocyanate), 4,4'-propylene-bis-(cyclohexyl isocyanate), bis-(para-isocyano-cyclohexyl)sulfide, bis-(para-isocyano-cyclohexyl)sulfone, bis-(para-isocyano-cyclohexyl)ethe thodes to producr, bis-(para-isocyano-cyclohexyl)diethyl silane, bis-(para-isocyano-cyclohexyl)diphenyl silane, bis-(para-isocyano-cyclohexyl)ethyl phosphine oxide; bis-(para-isocyano-cyclohexyl)phenyl phosphine oxide; bis-(para-isocyano-cyclohexyl)N-phenyl amine, bis-(para-isocyano-cyclohexyl)N-methyl amine, bis-(4-isocyano-phenyl)diethyl silane, bis-(4,isocyano-phenyl) diphenyl silane, dichloro-biphenylene diisocyanate bis-(4-isocyano-phenyl)ethyl phosphine oxide bls-(4-isocyano-phenyl)phenyl phosphine oxide, bis-(4-isocyano-phenyl)-N-phenyl amine, bis-(4-isocyano-phenyl)-N-methyl amine 3,3'-dimethyl-4,4'-diisocyano biphenyl, 3,3'-dimethoxy-biphenylene diisocyanate, 2,4-bis-(β-isocyano-t-butyl)toluene, bis-(Para-β-isocyano-t-butyl-phenyl)ether. para-bis-(2-methyl-4-isocyano-phenyl)-benzene, 3,3'-diisocyano adamantane, 3,3'-diisocyano biadamantane 3,3'-diisocyanoethyl-1-'-biadamantane, 1,2-bis-(3-isocyano-propoxy)ethane, 2,2-dimethyl propylene diisocyanate, 3-methoxy-hexamethylene diisocyanate 2,5-dimethyl heptamethylene diisocyanate, 5-methyl-nonamethylene diisocyanate, 1,4-diisocyano-cyclohexane, 1,2-diisocyano-octadecane, 2,5-diisocyano-1,3,4-oxadiazole, OCN(CH$_2$)$_3$O(CH$_2$)O(CH$_2$)$_3$NCO, OCN(CH$_2$)$_3$S(CH$_2$)$_3$NCO and

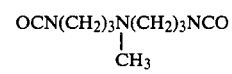

To form urethanes that have excellent chip and corrosion resistance, aliphatic diisocyanates are preferred. One aliphatic diisocyanate that is particularly preferred is hexamethylene diisocyanate.

The polyester used to form the polyester urethane is the esterification product of an alkylene glycol, a polyhydric alcohol having at least 3 hydroxy groups, and an aromatic dicarboxylic acid or its anhydride.

The polyester preferably has a hydroxyl number of 100 to 200.

Typical alkylene glycols that can be used to form the polyester are as follows: neopentyl glycol, ethylene glycol, propylene glycol, butane diol, 1,3-butylene glycol, pentane diol, 1,6-hexane diol, 2,2-dimethyl-1,3-dioxolane-4-methanol, 4-cyclohexane dimethanol, 2,2-dimethyl 1,3-propanediol, 2,2-bis(hydroxymethyl)propionic acid, and 3-mercapto-1,2-propane diol. A blend of 1,3-butylene glycol and 1,6-hexane diol is preferred to form a polyurethane that is soluble in conventional solvents and forms a primer with excellent chip resistance.

Polyhydric alcohols having at least three hydroxyl groups are used in the polyester. Typically useful polyhydric alcohols are trimethylol propane, trimethylol ethane, pentaerythritol, glycerin and the like. Trimethylol propane is preferred.

Typical aromatic dicarboxylic acids or their anhydrides that can be used to form the polyester are as follows: phthalic acid, phthalic anhydride, isophthalic acid, terephthalic acid and the like. Aliphatic dicarboxylic acids can be used with the aromatic dicarboxylic acid or anhydride. Typical acids are adipic acid, sebacic acid, succinic acid, azelaic acid, dodecanedioic acid and the like.

Preferably, the polyester is chain extended with a polycaprolactone. Typically, useful polycaprolactones are polycaprolactone triol and polycaprolactone diol.

One preferred polyester urethane is the reaction product of hexamethylene diisocyanate and a hydroxyl terminated polyester of 1,3-butylene glycol, 1,6-hexane diol, trimethylol propane, isophthalic acid and chain extended with polycaprolactone triol.

The polyester is prepared by conventional techniques in which the alkylene glycol, polyhydric alcohol and aromatic dicarboxylic acid with solvents are esterified at about 110°–250° C. for about 1–10 hours to form a polyester. The polyisocyanate and optionally the caprolactone are then added and reacted at about 75°–200° C. for about 15 minutes–2 hours to form the polyester urethane.

Optionally, about 0.1–4% by weight, based on the total weight of the polyester, of a catalyst can be used to prepare the polyester. Typical esterification catalysts are benzyl trimethyl ammonium hydroxide, tetramethyl ammonium chloride, organic tin compounds, such as dibutyl tin dilaurate, dibutyl tin oxide stannous octoate and the like, titanium complexes and litharge.

Typical solvents and diluents which can be used are, for example, toluene, xylene, butyl acetate, acetone, methylisobutyl ketone, methylethyl ketone methanol, isopropanol, butanol, hexane, acetone, ethylene glycol monoethyl ether, diethylene glycol monomethyl ether, VM and P naphtha, mineral spirits and other aliphatic, cycloaliphatic, aromatic hydrocarbons, esters, ethers and ketones.

The crosslinking agent used in the composition is a blend of monomeric and polymeric alkylated melamine formaldehyde resins. About 50–90% monomeric alkylated melamine formaldehyde resin and 10–50% polymeric alklyated melamine formaldehyde resin blend is used. Typically lower alcohols such as methanol, ethanol, propanol, isopropanol, butanol, isobutanol, hexanol and the like are reacted with melamine formaldehyde to form these crosslinking agents. One preferred crosslinking agent is a monomeric (50% methylated/50% butylated) melamine formaldehyde resin and a polymeric butylated) melamine formaldehyde resin.

An acid catalyst solution can be added to the composition to increase the rate of crosslinking of the composition on curing. Generally, about 0.1–2% by weight, based on the weight of the composition, of acid catalyst is used. Sulfonic acid or a substituted sulfonic acid can be used such as para-toluene sulfonic acid, dodecylbenzene sulfonic acid or dinonyl naphthalene disulfonic acid and mixtures thereof. Dinonyl naphthalene disulfonic acid is preferred.

Adducts of the aforementioned acids also can be used as catalysts. For example, epoxy resins or amines reacted with a substituted sulfonic acid may be used. Typical epoxy resins that can be used to form these adducts are "Epon" 828, 1001, 1002, 1003, 1004 which are the condensation products of epichlorohydrin and bisphenol A. Amines that are useful for forming adducts of these acids include primary, secondary and tertiary amines such as n-propyl amine, diisopropanol amine, dimethyl oxazolidine, dimethyl ethanol amine and others. Selection of the amines to be used is dependent upon baking conditions and package stability requirements.

Other catalysts that can be used include phosphoric acid, alkyl acid phosphates such as methyl and butyl acid phosphate and organic acid sulfate esters.

Preferably, about 0.1–5% by weight, based on the weight of the composition, of a rheology control additive is used in the composition. The additive contains about 80–99.5% by weight, based on the weight of the additive, of colloidal silica which can be either hydrophobic or hydrophilic and 0.5–20% by weight, based on the weight of the additive, of polyvinyl pyrolidone. Preferably, the colloidal silica has a particle size of about 0.2–1000 millimicrons and a surface area of about 50–1200 meters per gram. The silica is usually about 99.8% silicon dioxide by weight (on a moisture free basis) and exists in three dimensional branched chain aggregates.

One particularly preferred silica is a colloidal fumed silica with a hydrophilic surface having a surface area of about 100–500 square meters per gram and a nominal particle size assuming spherical particles) of about to 5–20 millimicrons.

Another preferred silica is colloidal fumed silica with a hydrophobic surface having a surface area of about 100–300 square meters per gram and having about two-thirds of the surface groups reacted with dimethyl siloxane. This silica forms a finish with low water sensitivity and is durable.

Bentone pigment which is a montmorillonite clay modified with hydroxyethyl cellulose can be used with the colloidal silica in the rheology control additive.

The rheology control additive contains polyvinyl pyrrolidone having a weight average molecular weight of about 3,000–500,000. One preferred polyvinyl pyrrolidone has a weight average molecular weight of about 100,000–200,000.

One preferred rheology control additive contains about 92–94% by weight of colloidal fumed silica with a hydrophilic surface that has a surface area of about 100–500 square meters per gram and about 6–8% by weight of the above described preferred polyvinyl pyrrolidone.

Another preferred rheology control additive contains about 90 to 96.9% by weight of colloidal fumed silica with a hydrophobic surface and has a surface area of about 100-500 square meters per gram and about to 3-8% by weight polyvinyl pyrrolidone having a weight average molecular weight of about 100,000-200,000 and 0.1 to 2% by weight of Bentone pigment.

Copolymers and terpolymers of vinyl pyrrolidone can be used containing up to 50% by weight of other compatible polymerized units. Typical monomers that can be used are as follows: vinyl acetate, vinyl chloride, vinyl stearate, methyl acrylate, styrene, diethyl hexyl maleate, didodecyl maleate, diethylene glycol bis(allyl carbonate), maleic anhydride, styrene, n-vinyl carbazole, vinyl laurate, acrylamide, allyl acetate, ally alcohol, crotonic acid, diallyl phthalate, dimethylaminoethyl vinyl sulfide, dimethylvinylethynylcarbinol, divinyl benzene, divinyl tetrachlorobenzene, itaconic acid, methacrylamide, methoxy styrene, methylene diacrylamide, methyl vinyl ketone, methyl vinyl pyrrolidone, tetramethallyl isocyanurate, trichloroethylene, vinylene carbonate, vinylimidazole, vinyl methyl benzimidazole, vinyl methyl dichlorosilane, vinyl methyl oxazolidinone, vinyl oxyethylurea, vinyl propionate, vinyl pyridine, ethylene oxide, and vinyl siloxanes.

The advantages of the rheology control additive in the coating composition are as follows: The composition can be sprayed at a high solids level without sagging and running on the substrate to which it was applied; upon baking of the composition after application, the finish does not pull away from the edges of the substrate; craters are substantially reduced; the resulting finish has a good appearance. Also, the rheology control additive is stable in the composition.

The composition contains pigments. These pigments can be introduced into the composition by first forming a mill base with the polyester urethane used in the composition or with other compatible polymers or polymeric dispersants by conventional techniques, such as sand-grinding, ball milling, attritor grinding, two roll milling to disperse the pigments. The mill base is blended with the film-forming constituents as shown in the following Examples.

Any of the conventional pigments used in coating compositions can be utilized in this composition such as titanium dioxide, zinc oxide, iron oxide and the like, metal hydroxide, carbon black, furnace black, sulfides, sulfates, carbonates, carbon black, silica, talc, china clay and the like. One preferred blend of pigments for a primer is carbon black in particular furnace black, crystalline silica, calcium carbonate. Preferably, a pigment to binder weight ratio of 50:100-200:100 is used.

The composition can also contain other conventional additives such as anticratering agents like benzoin, silicones, alkyd modified silicones, fluorocarbon resin and the like.

Generally, the composition of this invention is applied to a substrate by conventional techniques such as spraying, airless spraying, air assisted airless spraying, electrostatic spraying, dipping, brushing and flow coating can also be used, and then baked at 80°-190° C. for 10-60 minutes to form a durable, chip and corrosion resistant primer coat about 1-10 mils thick, preferably 3-6 mils thick. The composition is applied over conventional substrates used to make car and automobile bodies such as primed cold roll steel, primed phosphatized steel, primed treated steel, aluminum and the like. A conventional topcoat such as an enamel, lacquer or an ambient temperature curing enamel can be applied over the primer or a primer surfacer can be applied over the primer and then a topcoat applied. Optionally, a clear coat can be applied over the topcoat. The resulting finish then is cured and has excellent adhesion to the primer coat.

The primer has sufficient durability that it can be applied in the wheel well area and on rocker panels of an automobile or truck without any additional topcoat.

The following examples illustrate the invention. All parts and percentages are on a weight basis unless otherwise indicated. The molecular weights are determined by gel permeation chromatography using polymethyl methacrylate as a standard.

EXAMPLE 1

A polyester resin solution was prepared by reacting the following constituents in a polymerization vessel with a water separator and using reaction temperatures and times as are conventionally used to make polyester resins:

|  | Parts by Weight |
|---|---|
| 1,3-Butylene glycol | 120.41 |
| Xylene | 11.10 |
| 1,6 Hexane diol | 145.79 |
| Trimethylol propane | 70.41 |
| Isophthalic acid | 410.31 |
| Water | 44.44 |
| Xylene | 21.79 |
| Ethylene glycol monoethyl ether acetate | 249.10 |
| Total | 1073.36 |
| Water Loss* | 133.36 |
| Yield | 940.00 |

*Water loss includes water that was added to fill the water separation.

The resulting polyester resin solution had a weight solids content of about 70% and a Gardner Holdt Viscosity measured at 25° C. of about W-Z. The polyester resin had a molar percentage of constituents of 9.4% trimethylol propane, 22.1% 1.6 hexanediol, 24.2% 1,3 butylene diol and 44.3% isophthalic acid. The polyester resin had an acid no. of 6.5-8.5, a hydroxyl no. of 130-155, a Mn (number average molecular weight) of 1400, and Mw (weight average molecular weight) of 4,000.

A polyester urethane resin solution was prepared by reacting the following constituents using conventional reaction times and temperatures:

|  | Parts by Weight |
|---|---|
| Polyester resin solution (prepared above) | 291.62 |
| Polycaprolactone triol | 264.59 |
| Ethylene glycol monoethyl ether acetate | 52.46 |
| Slow aromatic hydrocarbon solvent | 199.85 |
| 1,6 Hexamethylene diisocyanate | 47.48 |
| Total | 856.00 |

The resulting polyester urethane resin solution had a weight solids content of 60% and a Gardner Holdt viscosity measured at 25° C. of about x-y. The polyester urethane had a molar percentage of constituents of 24% polyester, 38.7% polycaprolactone triol and 37.3% 1,6 hexamethylene diisocyanate, acid no. of 2.4–4.0, hydroxyl no. 85, Mn 3,700 and Mw 19,600.

A black dispersion was prepared as follows:

|  | Parts by Weight |
|---|---|
| Portion 1 | |
| Diethylene glycol monobutyl ether | 18.6 |
| Ethylene glycol monobutyl ether | 12.8 |
| Slow aromatic hydrocarbon solvent | 43.2 |
| Ethylene glycol monoethyl ether acetate | 14.0 |
| Diethylene glycol monomethyl ether | 20.4 |
| Butanol | 18.3 |
| Polyester urethane resin solution (prepared above) | 375.5 |
| Monomeric (50% methylated/50% butylated) melamine formaldehyde resin | 67.4 |
| Crystalline Silica (50 millimicron diameter) | 201.9 |
| Crystalline silica (30 millimicron diameter) | 73.8 |
| Calcium carbonate pigment | 75.9 |
| Furnace Black Pigment (carbon black) | 11.8 |
| Hydrophobic fumed silica (colloidal silica having a surface area of 110 square meters per gram and an average diameter of 16 millimicrons) | 5.0 |
| Bentone 27 (montmorillonite clay modified with ethyl cellulose) | 8.5 |
| Benzoin anticratering agent (benzoyl phenyl carbinol) | 5.0 |
| Portion 2 | |
| Polymeric butylated melamine formaldehyde resin | 47.9 |
| Total | 1000.0 |

Portion 1 was premixed and charged into a steel ball mill and ground about 26,000 cycles while maintaining the temperatures of the constituents being ground at about 38°–55° C. The resulting dispersion was removed from the mill and portion 2 was thoroughly mixed with the dispersion.

A primer composition was prepared by blending the following constituents:

|  | Parts by Weight |
|---|---|
| Portion 1 | |
| Black dispersion (prepared above) | 96.93 |
| "Anti-Terra" 203 (amine salt of carboxylic acid) | 0.41 |
| Portion 2 | |
| "Flowlen" AC-300 (alkyl acrylate/vinyl alkyl ether polymer) | 0.26 |
| Butanol | 1.12 |
| Dinonylnaphthalene disulfonic acid | 0.49 |
| Portion 3 | |
| Polyvinyl pyrrolidone solution (3% polyvinyl pyrrolidone having a Mw of 160,000 in butanol) | 0.79 |
| Portion 4 | |
| Solvent blend (85/15 methyl amyl ketone/butanol) | 3.00 |
| Total | 103.00 |

The above composition was sprayed onto an epoxy amino urethane primed cold roll steel panel and an epoxy amino urethane primed phosphatized steel panel and the panels were baked 162° C. for 15 minutes. The resulting primer was smooth and even and did not contain craters, had excellent adhesion to the substrate and had excellent salt spray corrosion resistance. The panels were subjected to a standard gravelometer test in which gravel under 70 psi pressure is thrown against the panels at room temperature and another set of panels at −28° C. The gravelometer test results were very good showing only minor chipping.

A second set of primed panels was prepared as above and coated with a conventional pigmented acrylic enamel which was top coated with a clear acrylic enamel and baked. Adhesion of the pigmented acrylic enamel to the primer was high and the resulting finish had an excellent appearance.

EXAMPLE 2

Primer compositions A, B and C were prepared. Primer composition A is identical to the primer composition of Example 1 except the monomeric (50% methylated/50% butylated) melamine formaldehyde and the polymeric butylated melamine formaldehyde resin were used in a 70/30 ratio. Primer composition B is identical to the primer composition of Example 1 except all of the monomeric (50% methylated/50% butylated) melamine formaldehyde resin was replaced with an equal amount of polymeric butylated melamine formaldehyde resin. Primer composition C is identical to the primer composition of Example 1 except all of the polymeric butylated melamine formaldehyde resin was replaced with an equal amount of monomeric (50% methylated/50% butylated) melamine formaldehyde resin.

Each of the above primer compositions were sprayed onto two separate epoxy amino urethane primed phosphatized steel panels and baked as in Example 1. One set of steel panels was coated with a high solids thermosetting silver metallic acrylic base coat and coated with a clear coat and baked to form a finish. All of the panels were subjected to the gravelometer test described in Example 1 and tested at −29° C. The results of the test are shown in the following Table:

TABLE

| | Gravelometer Data | | |
|---|---|---|---|
| | Primer A 70/30 Blend Monomer/ Polymeric Melamine | Primer B All Polymeric Melamine | Primer C All Monomeric Melamine |
| No Topcoat Panels | 8 | 5–6 | 6 |
| Topcoat of Clear/ Basecoat Panels | 8 | 5 | 6 |

Ratings:
0—Worst—All paint chipped off.
10—Best—No paint chipped off.

The above data shows that Primer A of the invention which contains a blend of monomeric and polymeric melamine formaldehyde resin as the crosslinking agent has superior chip resistance in both uncoated and topcoated panels in comparison to primers B and C. Primer B contains only polymeric melamine formaldehyde resin as the crosslinking agent and primer C contains only monomeric melamine formaldehyde as the crosslinking agent.

I claim:

1. A coating composition comprising about 17–80% by weight of film forming binder, about 20–83% by weight of liquid carrier, and contains in addition pigments in a pigment to binder weight ratio of about 50:100 to 300:100; wherein the binder consists essentially of about

- 50-90% by weight of a polyester urethane resin in which the polyester urethane consists of the reaction product of an aliphatic diisocyanate and a hydroxyl terminated polyester chain extended with a polylactone, wherein the polyester consists of the esterification product of alkylene glycol, a polyhydric alcohol having at least three hydroxyl groups, and an aromatic dicarboxylic acid, said polyester urethane has a hydroxyl number of about 75-200 and a weight average molecular weight of about 3,000-25,000 determined by gel permeation chromatography using polymethyl methacrylate as the standard and
- 5-50% by weight of a crosslinking agent consisting essentially of a blend of a monomeric butylated and methylated melamine formaldehyde resin and a polymeric butylated melamine formaldehyde resin.

2. The coating composition of claim 1 in which the polyester urethane consists of the reaction product of hexamethylene diisocyanate and a polyester chain extended with polycaprolactone triol; said polyester consisting of the esterification product of butylene glycol, hexane diol, trimethylol propane and isophthalic acid.

3. The coating composition of claim 2 in which the crosslinking agent consists essentially of 50-90% by weight of monomeric butylated and methylated melamine formaldehyde resin and 10-50% by weight of polymeric butylated melamine formaldehyde resin 4. The coating composition of claim 1 containing in addition about 0.1-5% by weight, based on the weight of the composition, of a rheology control agent comprising about 80-99.5% by weight, based on the weight of the rheology control agent, of colloidal silica and 0.5-20% by weight, based on the weight of the rheology control agent, of polyvinyl pyrrolidone having a weight average molecular weight of about 3,000-500,000.

5. The coating composition of claim 3 in which the rheology control agent consists essentially of
- a mixture of colloidal hydrophobic fumed silica and montmorillonite clay modified with hydroxy ethyl cellulose pigment and polyvinyl pyrrolidone having a weight average molecular weight of about 100,000-200,000.

6. The coating composition of claim 2 in which the pigments comprise silica, calcium carbonate, and carbon black and are in a pigment to binder weight ratio of about 50:100-200:100.

7. The coating composition of claim 1 in which the liquid carrier is an organic solvent for the binder, the pigment to binder weight ratio is about 50:100 to 200:100, the binder consists essentially of
- a polyester urethane consisting of the reaction product of hexamethylene diisocyanate and a polyester chain extended with a polycaprolactone triol, said polyester consisting of the esterification product of butylene glycol, hexane diol, trimethylol propane and isophthalic acid;

the crosslinking agent consists essentially of 50-90% by weight of a blend of a monomeric butylated and methylated melamine formaldehyde resin and 10-50% by weight of polymeric butylated melamine formaldehyde resin; and 0.1-5% by weight, based on the weight of the coating composition, of a rheology control agent consists essentially of a mixture of colloidal hydrophobic fumed silica and montmorillonite clay modified with hydroxy ethyl cellulose pigment and polyvinyl pyrrolidone having a weight average molecular weight of about 100,000-200,000; the pigments comprise a mixture of carbon black, crystalline silica and calcium carbonate.

8. A substrate coated with a 1-10 mil thick layer of the cured composition of claim 1.

9. A primed metal substrate coated with about 3-6 mil thick layer of the cured composition of claim 3 and topcoated with a crosslinked pigmented paint composition.

* * * * *